United States Patent
Hiasa

(10) Patent No.: US 10,326,951 B2
(45) Date of Patent: Jun. 18, 2019

(54) IMAGE PROCESSING APPARATUS, IMAGE PROCESSING METHOD, IMAGE CAPTURING APPARATUS AND IMAGE PROCESSING PROGRAM

(71) Applicant: CANON KABUSHIKI KAISHA, Tokyo (JP)

(72) Inventor: Norihito Hiasa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 29 days.

(21) Appl. No.: 15/514,019

(22) PCT Filed: Dec. 15, 2015

(86) PCT No.: PCT/JP2015/006259
§ 371 (c)(1),
(2) Date: Mar. 24, 2017

(87) PCT Pub. No.: WO2016/098348
PCT Pub. Date: Jun. 23, 2016

(65) Prior Publication Data
US 2017/0302868 A1    Oct. 19, 2017

(30) Foreign Application Priority Data
Dec. 19, 2014    (JP) .................. 2014-257239

(51) Int. Cl.
*H04N 5/217*    (2011.01)
*H04N 5/357*    (2011.01)
(Continued)

(52) U.S. Cl.
CPC ......... *H04N 5/3572* (2013.01); *G02B 3/0056* (2013.01); *G06T 5/002* (2013.01);
(Continued)

(58) Field of Classification Search
CPC .............................. H04N 5/217; H04N 5/357
(Continued)

(56) References Cited

U.S. PATENT DOCUMENTS 9,967,535 B2 *    5/2018    Laroia .................. H04N 5/2258
2004/0085459 A1    5/2004    Hoshuyama et al.
(Continued)

FOREIGN PATENT DOCUMENTS

JP    2003234950 A    8/2003
JP    2009038439 A    2/2009
(Continued)

OTHER PUBLICATIONS

International Search Report issued in Intl. Appln. No. PCT/JP2015/006259 dated Mar. 15, 2016.
(Continued)

*Primary Examiner* — Anthony J Daniels
(74) *Attorney, Agent, or Firm* — Rossi, Kimms & McDowell LLP

(57) ABSTRACT

The image processing apparatus 104 includes a processor performing a noise reduction on at least part of an input image produced by image capturing using an image capturing system 101, 102, and an acquirer acquiring first information on an optical characteristic of the image capturing system. The optical characteristic indicates a factor that degrades information of an object space in the image capturing of the input image. A processor changes a process of the noise reduction depending on the first information.

14 Claims, 9 Drawing Sheets

(51) Int. Cl.

| | |
|---|---|
| *H04N 5/222* | (2006.01) |
| *H04N 9/04* | (2006.01) |
| *G06T 5/00* | (2006.01) |
| *G06T 5/50* | (2006.01) |
| *H04N 13/271* | (2018.01) |
| *G02B 3/00* | (2006.01) |
| *H04N 5/232* | (2006.01) |
| *H04N 5/365* | (2011.01) |
| *H04N 13/243* | (2018.01) |
| *H04N 13/218* | (2018.01) |
| *H04N 13/25* | (2018.01) |
| *H04N 13/00* | (2018.01) |

(52) U.S. Cl.
CPC ............... *G06T 5/50* (2013.01); *H04N 5/217* (2013.01); *H04N 5/2226* (2013.01); *H04N 5/23222* (2013.01); *H04N 5/3575* (2013.01); *H04N 5/3656* (2013.01); *H04N 9/045* (2013.01); *H04N 13/218* (2018.05); *H04N 13/243* (2018.05); *H04N 13/25* (2018.05); *H04N 13/271* (2018.05); *G06T 2207/10028* (2013.01); *G06T 2207/20192* (2013.01); *H04N 2013/0081* (2013.01)

(58) Field of Classification Search
USPC .......................................................... 348/241
See application file for complete search history.

(56) References Cited

U.S. PATENT DOCUMENTS

| | | | |
|---|---|---|---|
| 2008/0273793 A1* | 11/2008 | Oishi | ..................... H04N 5/217 382/167 |
| 2010/0110235 A1 | 5/2010 | Higuchi | |
| 2011/0037877 A1 | 2/2011 | Tamaru | |

FOREIGN PATENT DOCUMENTS

| | | |
|---|---|---|
| JP | 2009171320 A | 7/2009 |
| JP | 2010109834 A | 5/2010 |
| JP | 2011041089 A | 2/2011 |
| JP | 2014192543 A | 10/2014 |

OTHER PUBLICATIONS

Written Opinion issued in Intl. Appln. No. PCT/JP2015/006259 dated Mar. 15, 2016.

Office Action issued in Japanese Appln. No. 2014-257239 dated Dec. 25, 2018. English translation provided.

* cited by examiner

IMAGE PROCESSING APPARATUS, IMAGE PROCESSING METHOD, IMAGE CAPTURING APPARATUS AND IMAGE PROCESSING PROGRAM

TECHNICAL FIELD

The present invention relates to an image processing technique of performing a noise reduction on an image.

BACKGROUND ART

In order to achieve a high image quality of an image produced by image capturing of an object space, it is important to reduce noise in the image. Typically, intensity of information of the object space included in the image is lower at a higher frequency, but intensity of the noise in the image is substantially constant irrespective of the frequency. Thus, a region with a higher frequency has a higher fraction of the noise included in an original signal of the image. For this reason, a high frequency component of the image is weakened to reduce the noise in a widely performed noise reduction.

As such a noise reduction disclosed is a method of reducing noise in an image while maintaining edge information of the object space by using a local characteristic of a signal of the image. Patent Document 1 discloses a method of categorizing a local region of an image into an edge part, a flat part and a gradation part and changing a noise reduction parameter depending on these categories. This method reduces the noise in the image while maintaining edge sharpness, by applying a weaker noise reduction in the edge part and a stronger noise reduction in the flat part where the noise is easily noticeable.

CITATION LIST

Patent Literature

[PLT1] Japanese Patent Laid-open No. 2010-109834

SUMMARY OF INVENTION

Technical Problem

However, the method disclosed in Patent Document 1 does not take into consideration an optical characteristic of an image capturing system (including an image capturing optical system and an image sensor, for example) that has produced an image that has noise to be reduced.

The image capturing system has a degree of freedom in an F-number and a focus position, and further in a focal length and the like when the image capturing optical system is a zoom lens. A characteristic of a produced image differs in accordance with the optical characteristic depending on the degree of freedom. Thus, a noise reduction without taking into consideration the optical characteristic of the image capturing system cannot efficiently reduce noise, and furthermore is likely to cause an increased loss in the information of the object space.

The present invention provides an image processing apparatus and the like that are capable of performing a favorable noise reduction on an image produced by image capturing.

Solution to Problem

The present invention provides as an aspect thereof an image processing apparatus including a processor configured to perform a noise reduction on at least part of an input image produced by image capturing using an image capturing system, and an acquirer configured to acquire first information on an optical characteristic of the image capturing system, the optical characteristic indicating a factor that degrades information of an object space in the image capturing of the input image. The processor is configured to change a process of the noise reduction depending on the first information.

The present invention provides as another aspect thereof an image capturing apparatus including the above image processing apparatus and at least part of the image capturing system.

The present invention provides as still another aspect thereof an image processing method of performing a noise reduction on at least part of an input image produced by image capturing using an image capturing system. The method includes preparing first information on an optical characteristic of the image capturing system, the optical characteristic indicating a factor that degrades information of an object space in the image capturing of the input image, and changing a process of the noise reduction depending on the first information.

The present invention provides as yet another aspect thereof an image processing program as a computer program that causes a computer to perform a noise reduction on at least part of an input image produced by image capturing using an image capturing system. The program causes the computer to acquire first information on an optical characteristic of the image capturing system, the optical characteristic indicating a factor that degrades information of an object space in the image capturing of the input image and to change a process of the noise reduction depending on the first information.

Further features and aspects of the present invention will become apparent from the following description of exemplary embodiments with reference to the attached drawings.

Advantageous Effects of Invention

The present invention changes the process of the noise reduction on the input image produced by the image capturing, depending on the information on the optical characteristic of the image capturing system, thereby performing a highly accurate noise reduction on the input image.

DESCRIPTION OF EMBODIMENTS

Exemplary embodiments of the present invention will be described below with reference to the accompanied drawings.

An imaging optical system used for image capturing has a degree of freedom in an F-number and a focus position, and further in a focal length and others when the optical system is a zoom lens. A characteristic of a produced image differs with an optical characteristic of the optical system depending on the degree of freedom. For example, a larger F-number increases an influence of diffraction, which restricts frequency information of an object space, which is acquirable from an image produced by image capturing to only a low frequency component. Therefore, performing on the image a stronger noise reduction than that in case of a smaller F-number does not cause a loss in the information of the object space included in the image. Thus, taking into consideration the optical characteristic of the imaging optical system used for image capturing, a noise reduction can efficiently reduce noise only while preventing the loss in the information of the object space. Embodiments will describe later a configuration and a method to achieve such a highly accurate noise reduction.

Next, description will be made of the optical characteristic of the image capturing system in the embodiments before specific description of the embodiments is made. The image capturing system in the embodiments mainly includes an imaging optical system (image capturing optical system) and an image sensor. The image capturing system causes light from the object space to form an optical image and photoelectrically converts the optical image into an analog electric signal (that is, performs sampling).

Factors that degrade the information of the object space include diffraction, aberration and defocus in the imaging optical system, and blur produced during exposure of the image sensor due to a displacement of the image capturing system or a movement of an object. The embodiments describe, among these factors, the diffraction, the aberration and the defocus which are design values of the imaging optical system or values previously acquirable by measurement, and collectively refer to these characteristics as "an optical characteristic". A later description will be made of a noise reduction taking information on the optical characteristic into consideration. However, the optical characteristic may include as its component all or part of the diffraction, aberration and defocus. This is because the diffraction, aberration and defocus have different causes, and magnitudes of their influences depend on an image capturing scene.

In the embodiments, the noise reduction takes into consideration a pixel pitch and a Nyquist frequency of the image sensor that are information on the sampling performed by the image sensor.

EXAMPLE 1

Figure 1:
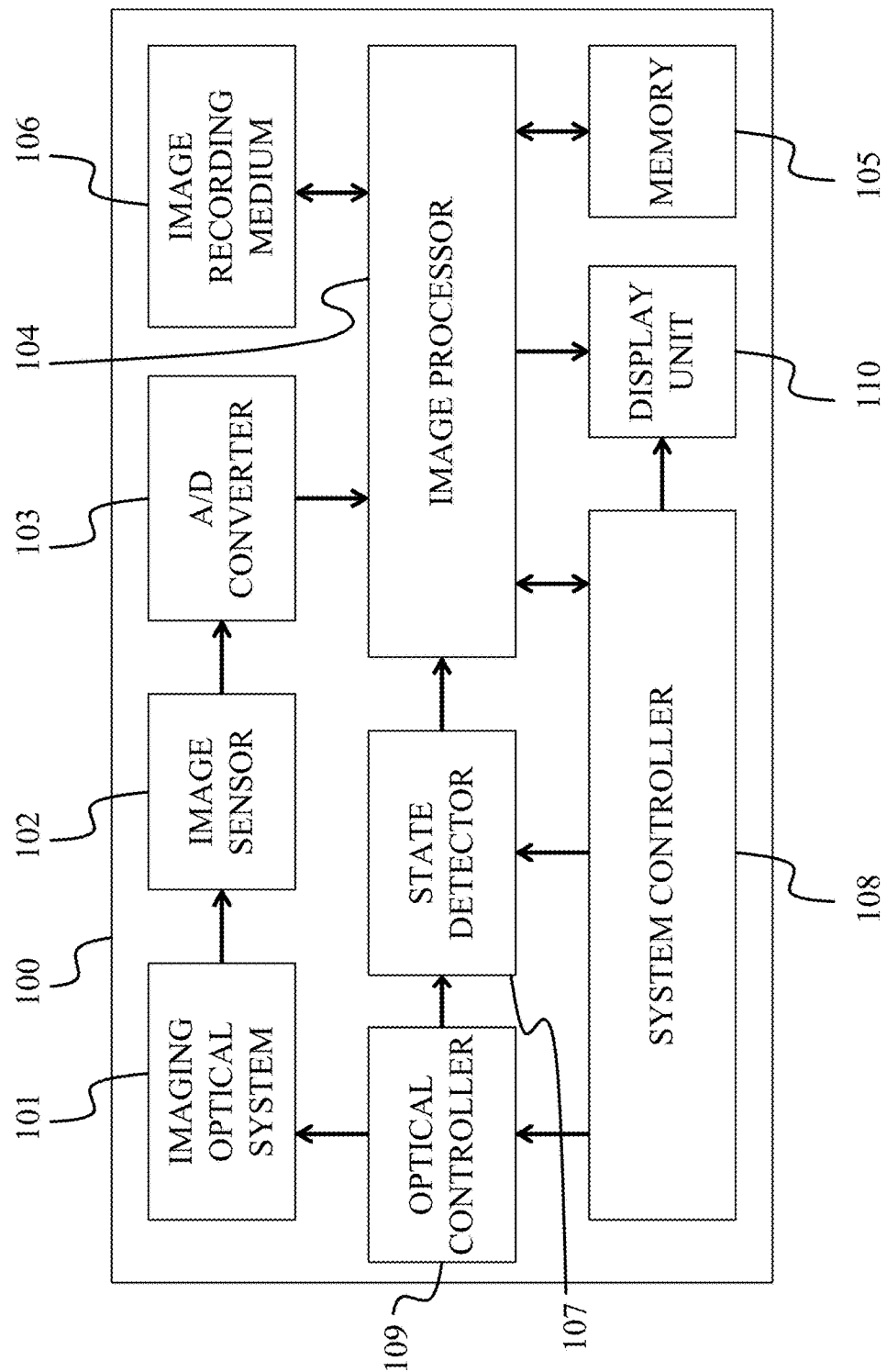
FIG. 1 is a block diagram of a configuration of an image capturing apparatus that is Embodiment 1 of the present invention.
Figure 2:
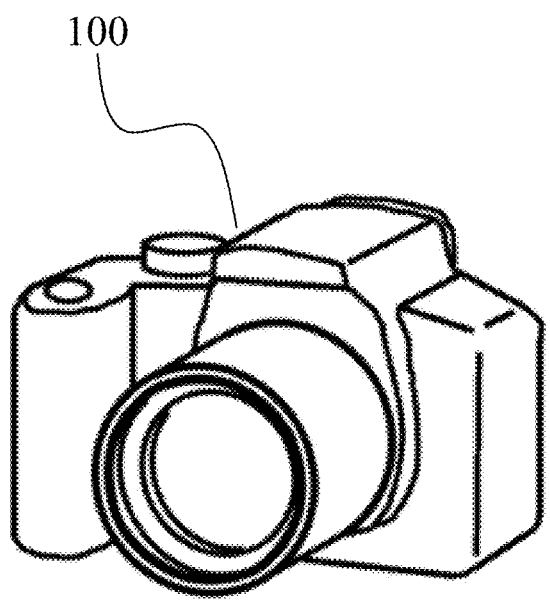
FIG. 2 is an exterior diagram of the image capturing apparatus of Embodiment 1.

A first embodiment (Embodiment 1) of the present invention will describe a case in which the components of the optical characteristic of the image capturing system (imaging optical system) are the diffraction and the aberration. FIG. 1 illustrates a basic configuration of an image capturing apparatus 100 according to Embodiment 1, and FIG. 2 is an external diagram of the image capturing apparatus 100.

Light entering an imaging optical system 101 from the object space (not illustrated) forms an optical image on the image sensor 102 by an imaging effect of the imaging optical system 101. The image sensor 102 is a photoelectric conversion element constituted by, for example, a CCD (charge coupled device) sensor or a CMOS (complementary metal-oxide semiconductor) sensor. The image sensor 102 photoelectrically converts the optical image into an analog electric signal. This analog signal is converted into a digital signal by an A/D converter 103 and then input to an image processor 104.

The imaging optical system 101 may be detachably attachable to the image capturing apparatus 100 including the image sensor 102. In other words, the image capturing apparatus 100 only needs to include at least part (that is, the image sensor 102) of the image capturing system.

The image processor 104 as an image processing apparatus performs typical image processes on the input digital signal to produce an input image as image data. In addition, the image processor 104 performs a noise reduction (noise reduction process), which is a process to reduce noise, on the input image. This noise reduction uses information (first information; hereinafter referred to as "optical characteristic information") on the optical characteristic of the imaging optical system 101 stored in a memory 105, which will be described in detail later.

An output image obtained through the above-described image processes and the noise reduction at the image processor 104 is stored in a predetermined format in an image recording medium 106. The image recording medium 106 may store, together with the output image, information (hereinafter referred to as "image capturing condition information") on an image capturing condition. The image capturing condition information includes a state of an aperture stop and a focus state of the imaging optical system 101 at image capturing to produce the input image, and further includes a focal length and others when the imaging optical system 101 is a zoom lens. A state detector 107 may obtain the image capturing condition information from a system controller 108 or an optical controller 109.

Alternatively, the image processor 104 may read an image previously stored in the image recording medium 106 as the input image and acquire the optical characteristic information from the memory 105 with reference to the image capturing condition information for the input image. Then, the image processor 104 may perform, on the input image, the noise reduction using the optical characteristic information.

The image stored in the image recording medium 106 is displayed on a display unit 110 constituted by, for example, a liquid crystal display.

The system controller 108 controls the above-described constituent components of the image capturing apparatus 100. An optical controller 109 controls mechanical drive of a focus lens, the aperture stop, a magnification-varying lens and others of the imaging optical system 101, in response to instructions from the system controller 108.

Next, a detailed description will be made of the noise reduction process (image processing method) performed by the image processor 104 with reference to a flowchart in FIG. 3 and FIGS. 4A and 4B. The image processor 104 as an image processing computer executes this process according to an image processing program as a computer program. The image processor 104 serves as an acquirer and a processor.

At step S101, the image processor 104 acquires an input image. The input image includes, together with the information of the object space, shot noise generated at the image sensor 102 and others.

At step S102, the image processor 104 acquires information (second information; hereinafter referred to as "sampling information") on sampling performed by the image capturing system (image sensor 102). The sampling information is, as described above, information on conditions of the sampling such as the pixel pitch indicating an interval of the sampling at the image sensor 102 and the Nyquist frequency as half of a frequency (sampling frequency) of the sampling. When the image sensor 102 includes multiple color channels for acquiring different colors and polarized lights, the image processor 104 acquires the sampling information corresponding to each color channel. For example, when a pixel array of the image sensor 102 is a Bayer array of RGB (red, green and blue), the sampling information for G and the sampling information for R and B are different from each other.

At step S103, the image processor 104 acquires a partial region in which the noise reduction is to be performed in this routine, from a noise reduction target region in the input image (that is, from at least part of the input image).

At step S104, the image processor 104 acquires (provides) the optical characteristic information for a position of the partial region acquired at step S103 in the input image. The optical characteristic information indicates the optical characteristic of the imaging optical system 101 at image capturing to produce the input image; the optical characteristic information includes an optical transfer function (OTF) and a point spread function (PSF). Alternatively, the optical characteristic information may be simply a spot diameter as a spread amount of a point image, for example. However, the optical transfer function and the point spread function are desirably acquired to perform the noise reduction with a higher accuracy.

Description will be made of parameters for determining the optical characteristic information. As described above, in this embodiment, the optical characteristic information includes the diffraction and the aberration as its components. A second embodiment (Embodiment 2) of the present invention will later give description about the defocus.

The diffraction is substantially constant irrespective of an image height. Thus, when only the diffraction is considered, the optical characteristic information depends on a state (shape and size) of a pupil of the imaging optical system 101 and does not depend on the position of the partial region acquired at step S103. In this case, the noise reduction may be performed for the entire input image as a single process, not only for the partial region acquired at step S103.

In contrast, the aberration changes with the image height. Thus, an acquirable threshold frequency of the object space changes with the image height. Consequently, the optical characteristic information changes with the position of the partial region acquired at step S103, that is, with the image height. In addition, the aberration also changes with the F-number and the focus position of the imaging optical system 101 and the focal length of the imaging optical system 101 as the zoom lens. Thus, these values are information needed to determine the optical characteristic information for the partial region.

Furthermore, the aberration also changes with a wavelength. Thus, when the image sensor 102 includes the multiple color channels, the wavelength is needed to determine the optical characteristic information. The aberration also changes with a defocus amount in the partial region, which is a difference between the focus position of the imaging optical system 101 and a depth of the partial region. Thus, the information to determine the optical characteristic information may include the depth of the partial region.

The optical characteristic includes both of the diffraction and the aberration in this embodiment, but may include only one of them as necessary. The optical characteristic may include the aberration only in a case of, for example, a large-aperture lens because performance degradation due to the aberration is dominant over that due to the diffraction. Alternatively, when the aperture stop is narrowed to set the F-number to an extremely large value, the optical characteristic may include the diffraction only because the aberration is extremely small but the influence of the diffraction is large in this case.

However, when an influence of vignetting of the imaging optical system 101 is large and the optical characteristic includes the diffraction only, the position of the partial region is needed as a parameter to determine the optical characteristic information. This is because a diffraction limit changes with the image height. On the other hand, when the optical characteristic includes as its component the aberration only, not all parameters such as the focus position and the image height are needed to be taken into consideration. For example, when performance degradation due to spherical aberration is dominant over that due to off-axis aberration as in a telephoto lens, performance fluctuation with the image height can be ignored, and only a parameter largely related to an aberration change may be used.

At step S105, the image processor 104 determines a process of the noise reduction depending on the optical characteristic information and the sampling information thus acquired. In other words, the image processor 104 changes the process of the noise reduction depending on the optical characteristic information and the sampling information. The determination or change of "the process of the noise reduction" includes determination or change of a parameter that changes (controls) strength of the noise reduction and selection or change of a method of the noise reduction. In this embodiment, the image processor 104 determines or changes the process of the noise reduction such that the strength of the noise reduction (in other words, a noise reduction effect) is stronger as a frequency component acquirable by the imaging optical system 101 is smaller. This is described below with reference to FIGS. 4A and 4B.

Figure 4A:
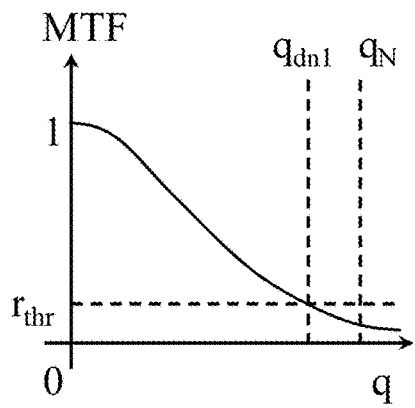
FIGS. 4A and 4B are explanatory diagrams of an optical characteristic in Embodiments 1 to 3.
Figure 4B:
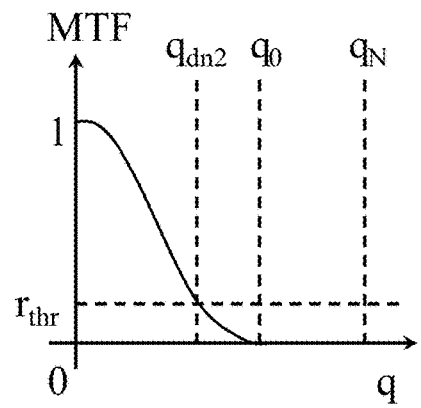

FIGS. 4A and 4B each illustrate an MTF (modulation transfer function) of the imaging optical system 101 obtained from the optical characteristic information. In FIGS. 4A and 4B, a horizontal axis represents a frequency q, and $q_N$ represents the Nyquist frequency of the image sensor 102 acquired from the sampling information. To simplify the description, the MTF is taken to be one-dimensional, and a negative frequency component is omitted. However, the following description is applicable to a case in which the MTF is two-dimensional.

FIG. 4A and FIG. 4B illustrate two types of the MTFs. The MTF illustrated in FIG. 4B shows that an acquirable frequency component is smaller than that shown by the MTF illustrated in FIG. 4A. This difference between the MTFs originates from, for example, a difference of the F-numbers with respect to the diffraction, and from a difference of the image heights with respect to the aberration. An image acquired with the optical characteristic illustrated in FIG. 4B has the information of the object space up to a lower frequency range than that of an image acquired with the optical characteristic illustrated in FIG. 4A. In FIG. 4B, $q_0$ represents a frequency at which the MTF has a zero value. In other words, any frequency component higher than the frequency $q_0$ in the image is determined to be noise. This suggests that a stronger process of the noise reduction than that in FIG. 4A can be selected for the optical characteristic corresponding to the MTF illustrated in FIG. 4B.

Next, description will be made of a method using, as an exemplary reference to determine the process of the noise reduction, a frequency at which an MTF is equal to or smaller than a predetermined value. When $q_{dn}$ represents a frequency at which the MTF is equal to or smaller than a predetermined threshold $r_{thr}$, $q_{dn}$ is equal to $q_{dn1}$ in FIG. 4A, and $q_{dn}$ is equal to $q_{dn2}$ in FIG. 4B. This frequency is used as the reference to determine the process of the noise reduction. A case of using a step function for the noise reduction and determining a parameter of the step function will be described as a simplest example. In this case, a Fourier transform of the partial region acquired from the input image is multiplied with a value of Expression (1) below to calculate an inverse Fourier transform of the multiplication.

$$H(q) = \begin{cases} 1 & (0 \leq |q| \leq q_{dn}) \\ 0 & (q_{dn} < |q|) \end{cases} \quad (1)$$

When $q_{dn}$ is larger than $q_N$, a signal of the object space cannot be distinguished from noise. Thus, the process of the noise reduction may be changed depending on $q_{dn}$ and $q_N$, which respectively are the optical characteristic information and the sampling information (that is, depending on a relation between the optical characteristic information and the sampling information). Although this description is made by using the Fourier transform of the image, a discrete cosine transform or a wavelet transform may be used, for example.

At step S106, the image processor 104 performs the noise reduction for the partial region acquired at step S103 by the process determined at step S105. The method of the noise reduction may be a smoothing filter such as a bilateral filter, an NLM (non-local means) filter, or the step function in Expression (1), for example.

At step S107, the image processor 104 determines whether or not the noise reduction has completed for the partial regions acquired from the entire noise reduction target region in the input image. If this noise reduction has completed, the image processor 104 ends this noise reduction process. If the noise reduction has not yet completed, the image processor 104 returns to step S103 to acquire a new partial region from the noise reduction target region and repeats the processes at steps S103 to S107.

This embodiment provides the image capturing apparatus 100 including the image processor 104 capable of performing a highly accurate noise reduction with taken into consideration the optical characteristic (diffraction and aberration) of the image capturing system and the conditions (pixel pitch and Nyquist frequency) of the sampling.

EXAMPLE 2

Figure 5:
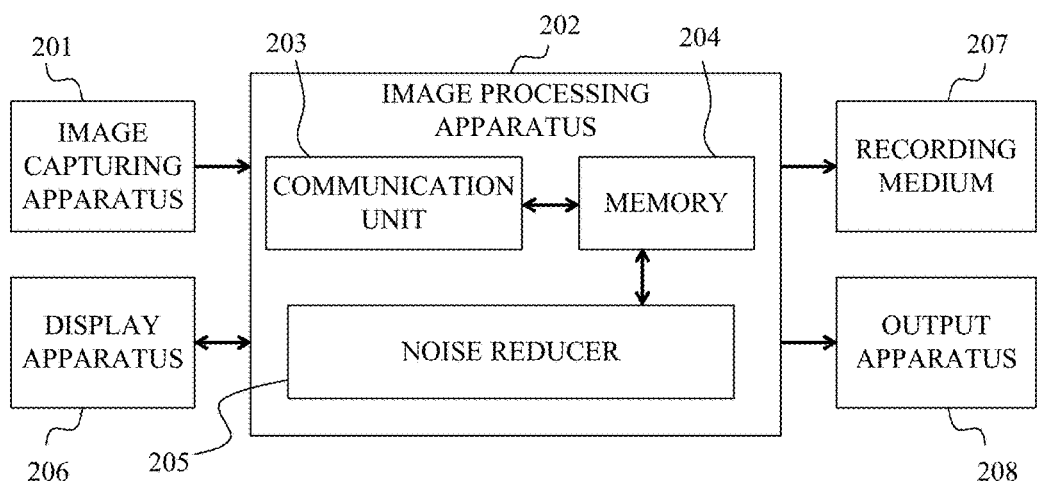
FIG. 5 is a block diagram of a configuration of an image processing system that is Embodiment 2 of the present invention.
Figure 6:
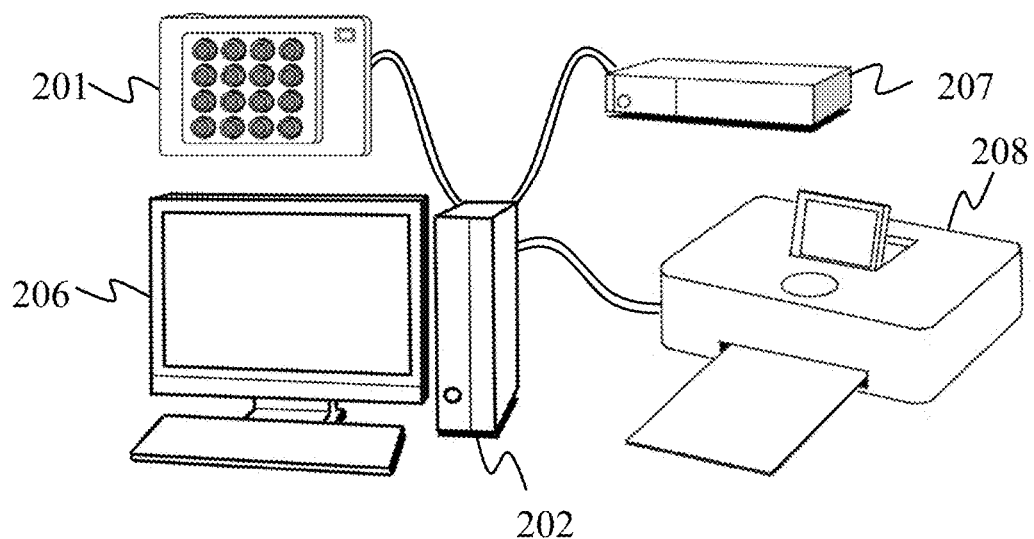
FIG. 6 is an exterior diagram of the image processing system of Embodiment 2.

Next, description will be made of an image processing system that is a second embodiment (Embodiment 2) of the present invention to which the above-described image processing method is applied. This embodiment describes the defocus as the component of the optical characteristic of the image capturing system. Embodiment 1 describes the case in which the image processing apparatus (image processor 104) is built in the image capturing apparatus 100. In this embodiment, as illustrated in a system configuration diagram of FIG. 5 and a system exterior diagram of FIG. 6, an image capturing apparatus 201 and the image processing apparatus 202 that performs the noise reduction are separately provided.

An input image produced by image capturing through the image capturing apparatus 201 is input to the image processing apparatus 202 through a communication unit 203 provided in the image processing apparatus 202. The image capturing apparatus 201 is configured to acquire multiple parallax images having parallaxes therebetween (described in detail later).

The image processing apparatus 202 acquires (produces), from information on the parallaxes, information on a depth of an object space at each position (coordinates) in the input image, in other words, a depth map as information on a distribution of the depth in the input image. The image processing apparatus 202 then stores the depth map in a memory 204. The image processing apparatus 202 also acquires optical characteristic information of the image capturing apparatus (image capturing system) 201 used for image capturing to produce the input image, from the image capturing apparatus 201 or from a set of information associated with the input image. The image processing apparatus 202 then stores the optical characteristic information on the memory 204.

A noise reducer 205 as an acquirer and a processor included in the image processing apparatus 202 performs a noise reduction on the input image acquired through the communication unit 203. An output image after the noise reduction is output through the communication unit 203 to at least one of a display apparatus 206, a recording medium 207 and an output apparatus 208. The display apparatus 206 is constituted by a liquid crystal display or a projector, for example, and displays the output image. The recording medium 207 is a semiconductor memory, a hard disk, or a server on a network, for example, and stores the output image. The output apparatus 208 is constituted by a printer that prints the output image, for example. The image processing apparatus 202 may have functions to perform a development process and other image processes as necessary.

Figure 7:
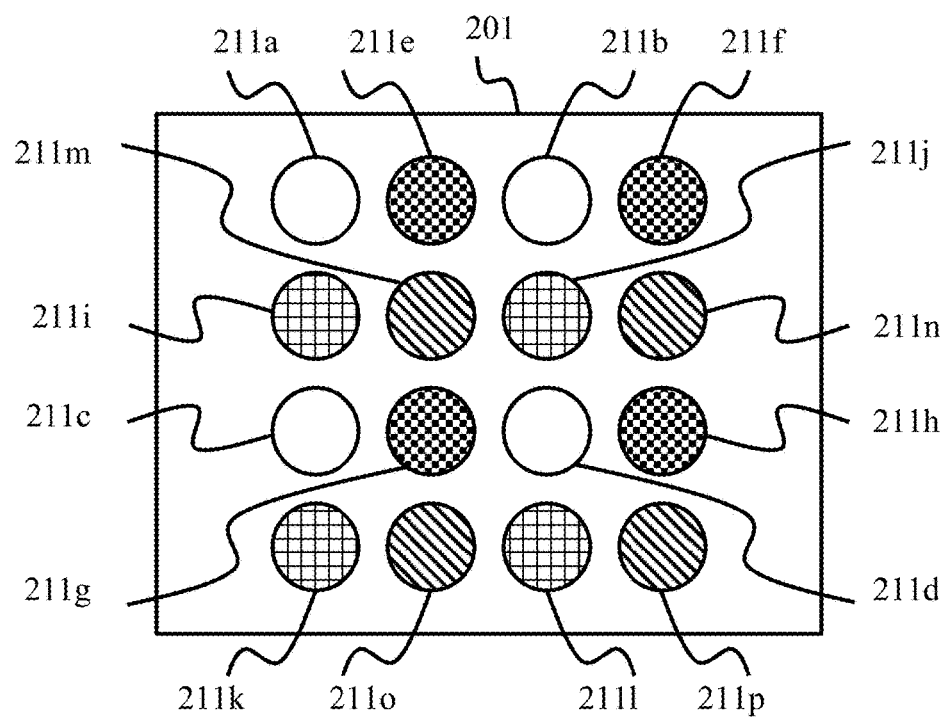
FIG. 7 is an arrangement diagram of an imaging optical system in Embodiment 2.
Figure 8:
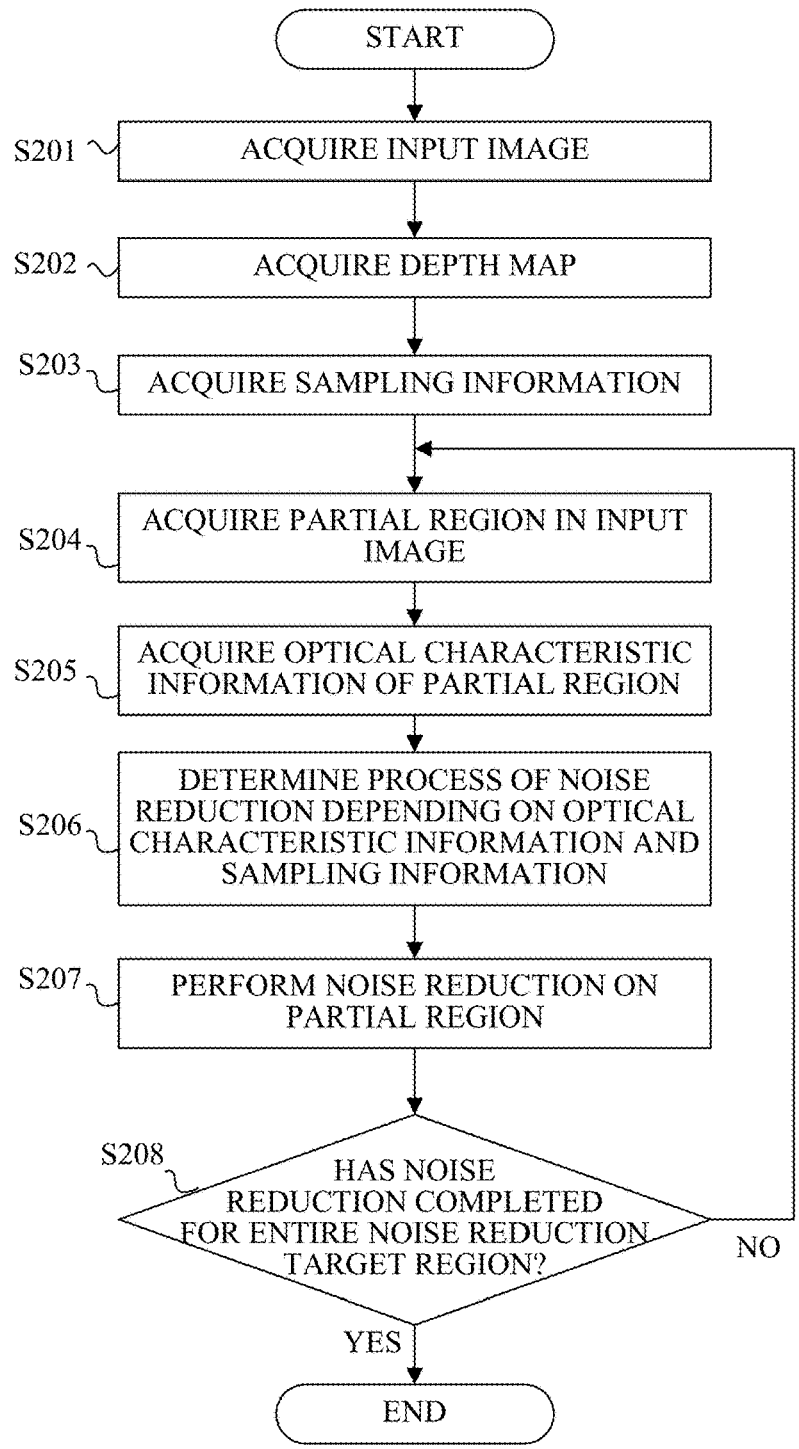
FIG. 8 is a flowchart showing a noise reduction process in Embodiments 2 and 3.

FIG. 7 illustrates a configuration of the image capturing apparatus 201. The image capturing apparatus 201 includes a multi-lens imaging optical system constituted by imaging optical systems 211a to 211p two-dimensionally disposed. Each of the imaging optical systems 211a to 211p includes an image sensor (not illustrated) on its image plane side. This configuration allows the image capturing apparatus 201 to produce multiple parallax images having parallaxes therebetween through image capturing from multiple viewpoints and to obtain information of the parallaxes of the object space from these parallax images. The image sensors may be replaced with a single image sensor that can receive all optical images formed by the imaging optical systems 211a to 211p. The number of pixels may differ between the image sensors corresponding to the imaging optical systems.

The imaging optical systems 211a to 211p include multiple types of imaging optical systems whose focal lengths are mutually different. The imaging optical systems 211a to 211d are wide-angle lenses, and the imaging optical systems 211*e* to 211*h* are normal lenses. The imaging optical systems 211*i* to 211*l* are semi-telephoto lenses, and the imaging optical systems 211*m* to 211*p* are telephoto lenses. The types of the imaging optical systems and the number and arrangement thereof for each type are not limited to the configuration illustrated in FIG. 7. The image capturing apparatus 201 does not necessarily need to include the multi-lens imaging optical system, but may be a plenoptic camera, for example. The image capturing apparatus 201 may include a single-lens imaging optical system when information on the distribution of the depth of the object space is acquirable from other than parallax images. The information on the distribution of the depth may be acquired by using a TOF (time of flight) method and structured illumination.

Next, detailed description will be made of a noise reduction process (image processing method) performed by the image processing apparatus 202 (noise reducer 205) with reference to a flowchart in FIG. 8 and FIGS. 9 to 11. The image processing apparatus 202 as an image processing computer executes this process according to an image processing program as a computer program.

At step S201, the noise reducer 205 acquires an input image through the communication unit 203 from the image capturing apparatus 201. The input image may be multiple parallax images obtained by the image capturing apparatus 201 as described above, or may be one viewpoint image among the parallax images. Alternatively, the input image may be a combined image obtained by combining these parallax images. In this case, however, when optical characteristics of the imaging optical systems corresponding to the respective parallax images are mutually different (for example, when image capturing is performed with the imaging optical systems 211*a* to 211*d* whose F-numbers are mutually different), the following problem occurs.

A noise reduction for such a combined image requires calculation of an optical characteristic at each position in the combined image, which is difficult. Thus, when the input image is the combined image obtained by combining multiple parallax images corresponding to the respective imaging optical systems having mutually different optical characteristics, a noise reduction described below is desirably performed on the parallax images before being combined. Description below will be made of a case where multiple parallax images are obtained as the input images.

At step S202, the noise reducer 205 acquires (produces) the depth map of the input image. In this embodiment, because information on the parallaxes of the object space is acquirable from the multiple parallax images as the input images, the depth map is acquired by, for example, a stereo method. Although the depth can be estimated only in an edge part of an image in which a feature point exists, the depth in a non-edge region such as a gradation region can be calculated by interpolation with the depth in the edge part.

At step S203, the noise reducer 205 acquires sampling information of the image sensor corresponding to each parallax image as the input image among the multiple image sensors provided to the image capturing apparatus 201.

At step S204, the noise reducer 205 acquires a partial region in which the noise reduction is to be performed in this routine, in a noise reduction target region that is the entire input image or part thereof.

At step S205, the noise reducer 205 acquires the optical characteristic information at a position of the partial region acquired at step S204 in the parallax image. The optical characteristic information in this embodiment is a defocus characteristic of the imaging optical system corresponding to the parallax image. Performance degradation due to defocus is larger as the depth of the partial region acquired at step S204 is further away from a focus position (that is, an in-focus plane) of the imaging optical system, in other words, as a defocus amount is larger. In addition, a degree of the performance degradation for the same defocus amount still changes with the focal length and the F-number of the imaging optical system. Thus, determination of the optical characteristic information requires the F-number, the focus position and the focal length (in the zoom lens) of the imaging optical system and the position (that is, the depth) of the partial region. Although the defocus characteristic changes with the wavelength, a large absolute value of the defocus amount gives a small difference between defocus characteristics for different wavelengths, and thus determination of whether or not to take the defocus characteristic into consideration for each wavelength may depend on the defocus amount.

As described above, the information on the depth of the object space is needed to take the defocus into consideration as the optical characteristic. However, because objects typically exist at various depth positions, a change in an acquirable frequency due to the defocus is larger than those due to the aberration and the diffraction described in Embodiment 1. Thus, performing the noise reduction with the defocus taken into consideration as the optical characteristic as in this embodiment provides a noise reduction effect with a higher accuracy than that obtained in Embodiment 1.

Figure 3:
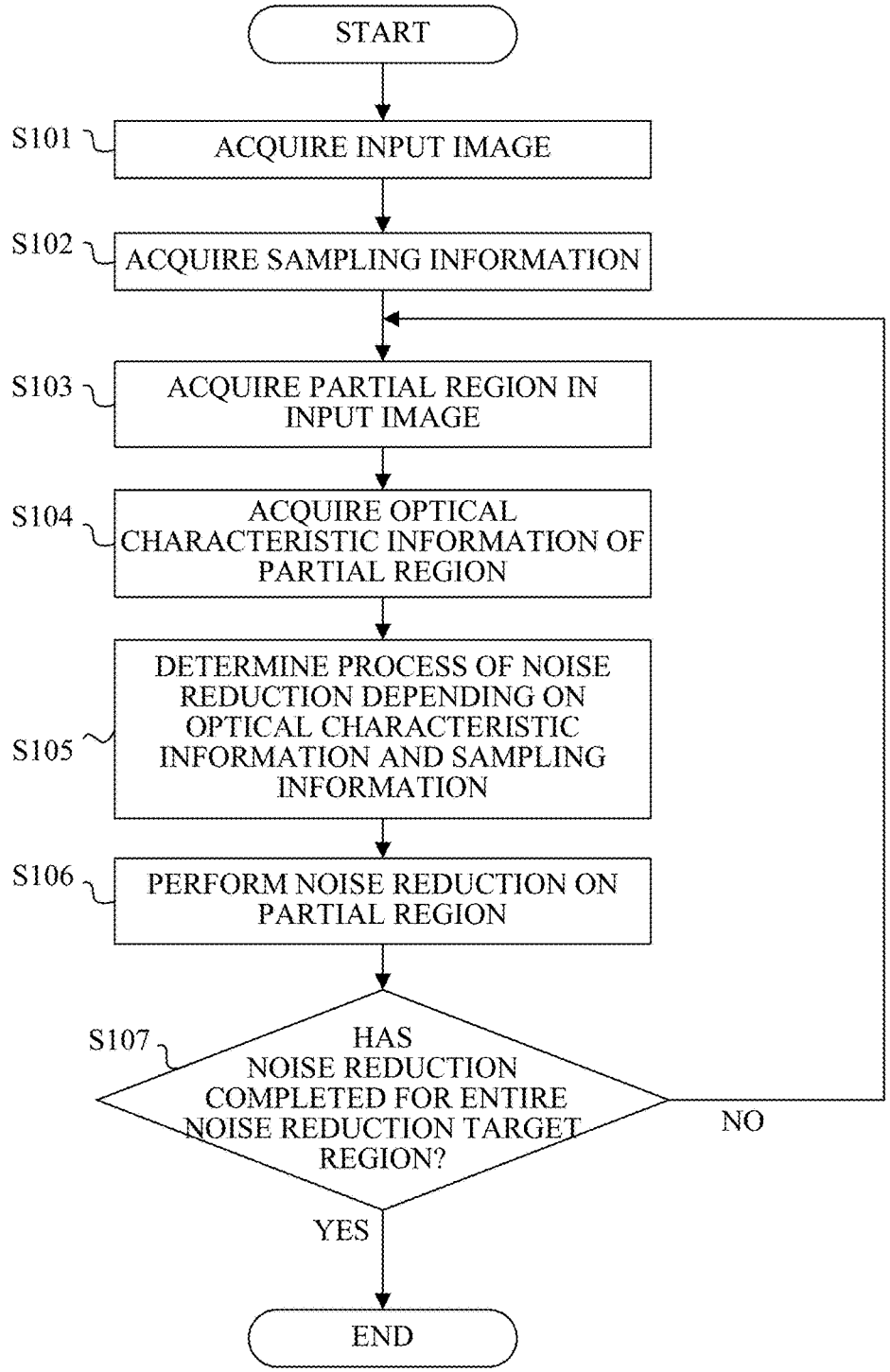
FIG. 3 is a flowchart showing a noise reduction process in Embodiment 1.

Processes of steps S206 to S208 are the same as the processes of steps S105 to S107 in Embodiment 1 (FIG. 3). Specifically, the noise reducer 205 determines the process of the noise reduction depending on the optical characteristic information and the sampling information at step S206 and performs the noise reduction by the determined process on the partial region at step S207. Then, the processes of steps S204 to S207 are repeated until it is determined that the noise reduction has completed for the entire noise reduction target region in the input image (parallax image) at step S208.

This embodiment can achieve the image processing apparatus 202 and the image processing system that are capable of performing a highly accurate noise reduction with the optical characteristic (defocus) of the image capturing system and the conditions of the sampling taken into consideration.

Next, description will be made of a desirable condition to achieve a higher accuracy of the noise reduction in this embodiment.

The partial region is desirably acquired (extracted) from the input image at step S204 in the following manner. First, the depth map is divided such that a division pitch is larger as a division position is further away from the image capturing system (image capturing apparatus 201) in a direction corresponding to the depth (in other words, a depth direction). This division provides multiple defocus characteristic regions whose defocus characteristics are mutually different. In other words, the division provides multiple defocus characteristic regions in each of which a range of the defocus characteristic (defocus characteristic range) can be regarded as a range of an identical defocus characteristic and whose defocus characteristic ranges are mutually different. Then, the partial region is acquired from one (single) defocus characteristic region among the multiple defocus characteristic regions.

If any multiple regions whose depths are discontinuous exist on a boundary between multiple objects in the partial region, completely different defocus characteristics exist in the partial region, which leads to a reduced effect of this embodiment. Thus, the partial region is desirably acquired from a single defocus characteristic region whose defocus characteristic range can be regarded as an identical defocus characteristic.

Description will be made of a reason why the division pitch of the defocus characteristic regions is larger as the division position is further away from the image capturing apparatus 201. To simplify the description, the imaging optical system is approximated to a thin system. In this case, an imaging equation is given by Expression (2) below.

$$\frac{1}{\sigma} = \frac{1}{f} + \frac{1}{s} \qquad (2)$$

In this expression, f represents a focal length of the imaging optical system, σ represents a distance from the imaging optical system to the image sensor, and s represents a distance from the imaging optical system to an in-focus plane (an object side plane conjugate with the image sensor with respect to the imaging optical system). An origin of a distance coordinate system is located at a position of the imaging optical system. Thus, s and σ have different signs when the imaging optical system forms a real image.

A spread of an image (hereinafter referred to as "an image spread") due to the defocus on the image sensor is equal to δ at two imaging distances, which is given by Expression (3) below.

$$\sigma + \Delta\sigma_i = \sigma + \frac{(-1)^i F \delta f}{f - (-1)^i F \delta} \qquad (3)$$

In this expression, F represents an F-number of the imaging optical system. $\sigma+\Delta\sigma_i$ represents two imaging distances at which the image spread due to the defocus is δ on the image sensor, where i is 1 or 2. Object distances $s+\Delta s_i$ corresponding to the two imaging distances represented by Expression (3) are represented by Expression (4) below by using Expression (2).

$$s + \Delta s_i = s + \frac{(f+s)^2 \Delta\sigma_i}{f^2 - (f+s)\Delta\sigma_i} \qquad (4)$$

Expression (3) is approximately rewritten to Expression (5) below when f is sufficiently larger Fδ.

$$\sigma + \Delta\sigma_i = \sigma + (-1)^{-i} F\delta \qquad (5)$$

Substituting Expression (5) into Expression (4) yields Expression (6) below.

$$s + \Delta s_i = s + \frac{(-1)^i F(f+s)^2 \delta}{f^2 - (-1)^i F(f+s)\delta} \qquad (6)$$

Expression (6) is rewritten to yield Expression (7) below, which represents a relation between the image spread δ due to the defocus and the defocus amount $\Delta s_i$ on an object space side.

$$\delta = \frac{(-1)^i f^2 \Delta s_i}{F(f+s)(f+s+\Delta s_i)} \qquad (7)$$

Figure 9:
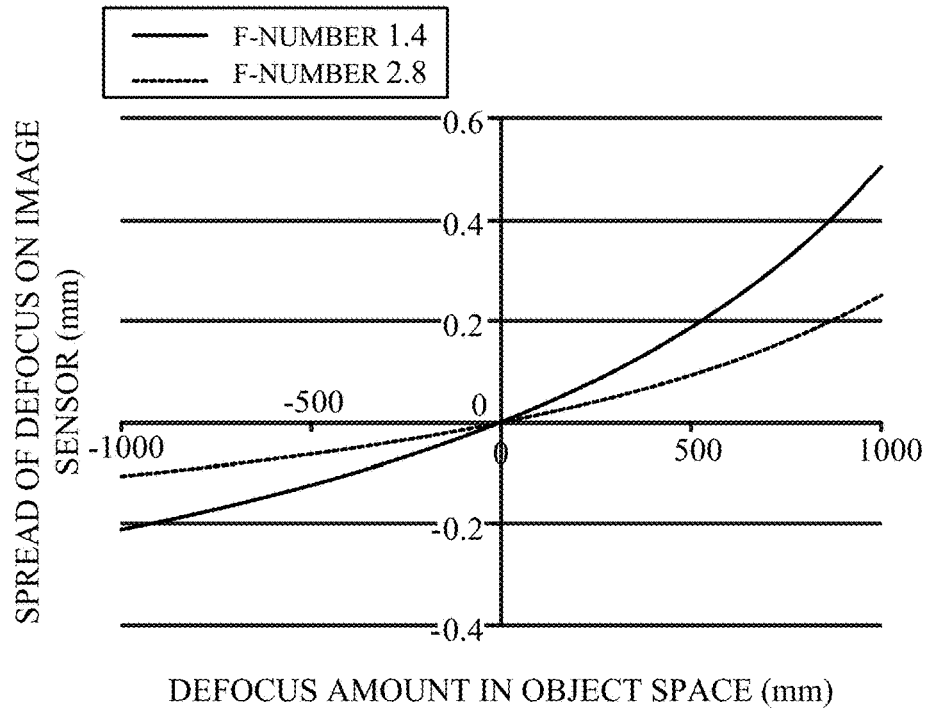
FIG. 9 illustrates a relation between a defocus amount and a spread of an image thereof in Embodiments 2 and 3.

FIG. 9 illustrates graphs each showing the relation obtained using Expression (7) between defocus amount $\Delta s_i$ and the image spread δ. In FIG. 9, f is 50 [mm], and s is −2500 [mm], and this relation is illustrated for a case of an F-number of 1.4 (shown by a solid line) and an F-number of 2.8 (shown by a dashed line). In FIG. 9, a horizontal axis represents the defocus amount $\Delta s_i$ (s=−2500 at an origin thereof, and a point thereon closer to a positive side represents a position closer to the image capturing apparatus 201) on the object space, and a vertical axis represents the image spread δ due to the defocus (in other words, a spread of defocus blur) on the image sensor, the spread corresponding to the defocus amount. The spread δ may be expressed in an absolute value, but is here in a signed value to explicitly show a shape of the graph.

As understood from FIG. 9, as the distance from the image capturing apparatus 201 to the object becomes larger, a change in the spread of defocus blur becomes smaller. Thus, dividing the object space into regions such that the spreads of defocus blur are mutually approximately equal between the regions is equivalent to dividing the depth with a larger interval (pitch) as the division position is further away from the image capturing apparatus 201.

Figure 10:
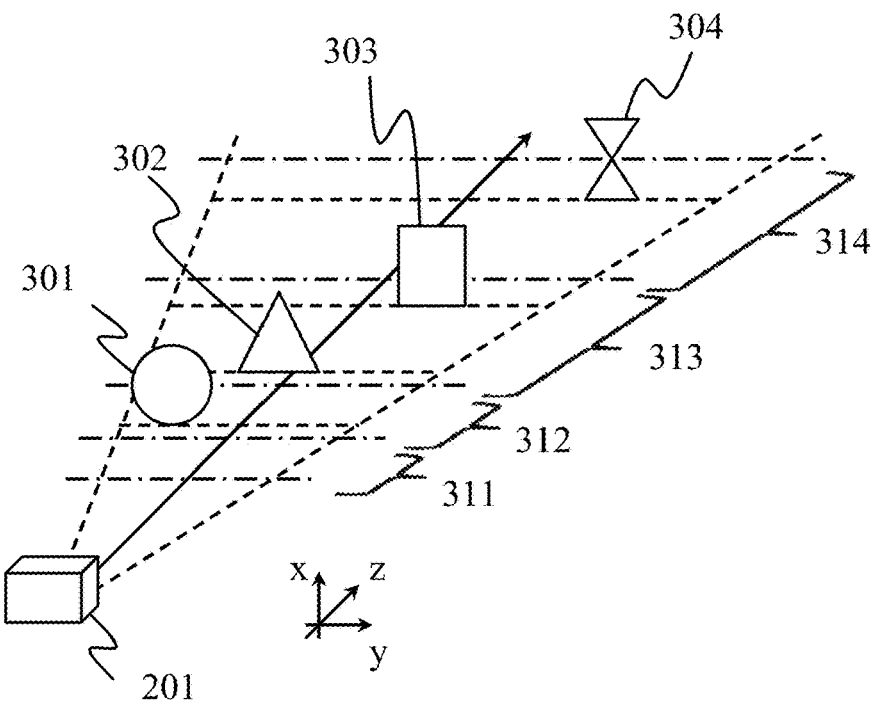
FIG. 10 illustrates an exemplary image capturing scene in Embodiments 2 and 3.
Figure 11:
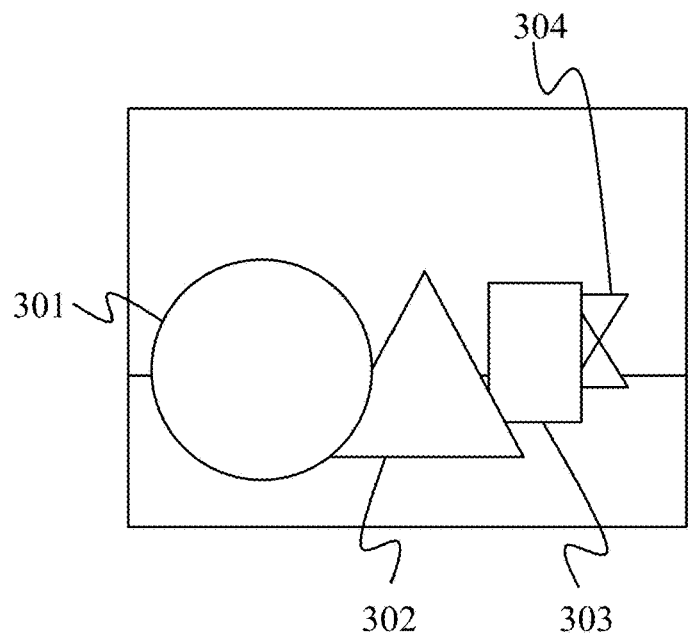
FIG. 11 illustrates an exemplary image produced by image capturing in Embodiments 2 and 3.

A specific example of the division is described with reference to FIGS. 10 to 12. FIG. 10 illustrates an exemplary scene (image capturing scene) of which image is captured by the image capturing apparatus 201. In the image capturing scene, there are a first object 301, a second object 302, a third object 303 and a fourth object 304 in this order from the image capturing apparatus 201. FIG. 11 illustrates one of multiple parallax images produced by image capturing of the image capturing scene illustrated in FIG. 10. In reality, the imaging optical system of the image capturing apparatus 201 is focused on either object (in-focus plane) in the parallax image of FIG. 11, and the image has a larger defocus blur as a position is further away from the in-focus plane. In FIG. 11, however, image degradation due to this defocus is ignored. Dashed lines in FIG. 10 represent the depths of the first to fourth objects 301 to 304 and an image capturing angle of view of the imaging optical system used in the image capturing to produce the parallax image of FIG. 11.

In FIG. 10, dashed-dotted lines divide the depth into regions in which the spreads of defocus blur in the object space are mutually equal. Each region between two dashed-dotted lines is a region whose defocus characteristic range can be regarded as a range of an identical defocus characteristic, in other words, a region having an identical defocus characteristic, which is one defocus characteristic region. FIG. 10 illustrates four exemplary defocus characteristic regions 311 to 314. However, there may be defocus characteristic regions on a front side (closer side) of the defocus characteristic region 311 and on a back side (farther side) of the defocus characteristic region 314.

Figure 12:
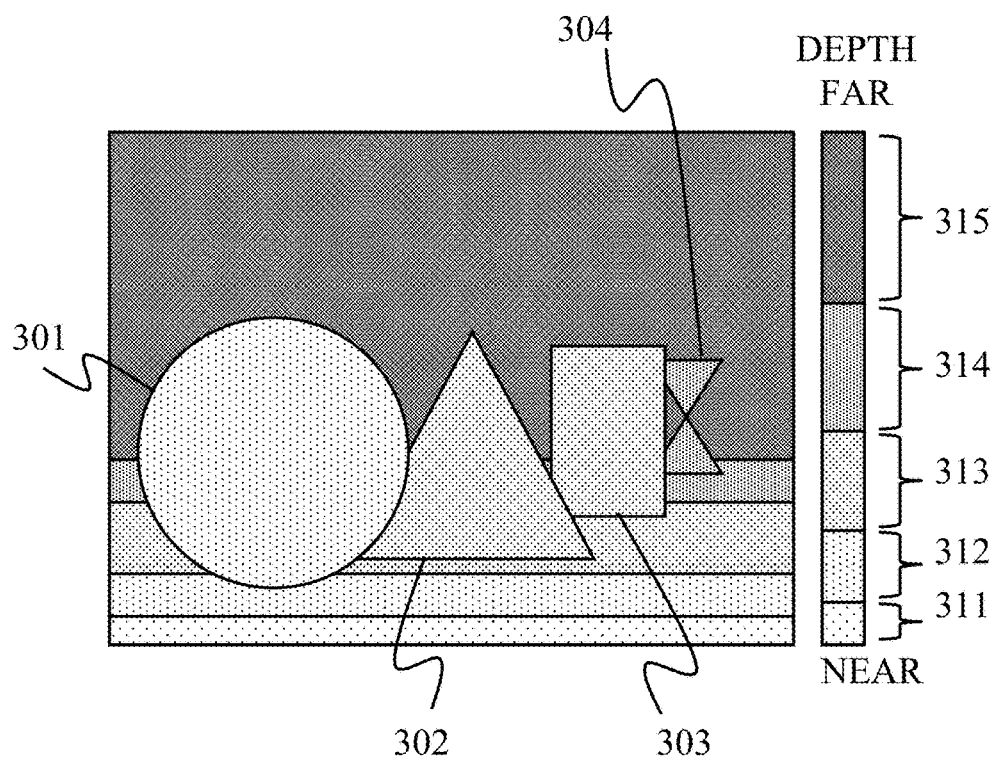
FIG. 12 illustrates a defocus characteristic region in Embodiments 2 and 3.

FIG. 12 illustrates the defocus characteristic regions 311 to 314 over the input image. In FIG. 12, different densities of dots correspond to different depths, and a region with identical densities represents one defocus characteristic region. FIG. 12 illustrates a defocus characteristic region 315 on the farther side of the defocus characteristic region 314, which is not illustrated in FIG. 10. Acquiring the partial region from a single defocus characteristic region can prevent degradation in the accuracy of the noise reduction.

The optical characteristic information corresponding to the partial region acquired at step S204 is desirably set for an average value of the depth in the partial region. This provides appropriate (less erroneous) optical characteristic information for the depth that fluctuates in the partial region, which achieves a highly accurate noise reduction for the partial region.

In addition, it is desirable to acquire a map of a degree of depth reliability indicating an accuracy of the depth map for the input image and to determine (change) the process of the noise reduction depending on the degree of depth reliability. Since the depth map is calculated from parallax images in this embodiment, an accuracy of estimating the depth is reduced due to, for example, a small number of corresponding points among the parallax images. Similarly, when the depth is acquired by the TOF method and the structured illumination, any disturbance and a characteristic of an object surface may reduce an accuracy of the acquisition. Use of such an inaccurate depth acquired in this manner in the process reduces the accuracy of the noise reduction. For example, even though the depth is acquired by actually acquiring the information on the object space up to a high frequency range, a low accuracy (reliability) of the depth may result in a determination that the information is acquired only for a low frequency range, which leads to such an excessive noise reduction that the information of the object space is lost. Thus, it is desirable to change the process of the noise reduction depending on the degree of depth reliability.

For example, a threshold relating to the degree of depth reliability may be provided. The process of the noise reduction is selected which weakens the strength of the noise reduction (that is, the noise reduction effect) for a region where the degree of depth reliability is lower than the threshold, compared to that for a region that has the same depth value and where the degree of depth reliability is higher than the threshold. This can reduce a risk of losing the information of the object space due to the excessive noise reduction as described above. The strength of the noise reduction may be weakened by adjusting a parameter in the same method of the noise reduction, or by changing the method of the noise reduction itself.

Alternatively, when the depth is calculated from parallax images, the degree of depth reliability may be defined to be high in a partial area having a large number of corresponding points among the parallax images and in an edge area where the noise reduction is stronger. This is because a calculation accuracy of the depth is higher in the partial area having a larger number of corresponding points and in the edge area where the noise reduction is stronger.

In calculation of the depth from parallax images, defocus of each parallax image has such an influence that a target feature point (object) in the parallax images is more unlikely to be extracted when the target feature point is located further away from the in-focus plane, which reduces the degree of depth reliability for the feature point. In such a case, a specific depth for which an accuracy of extracting the feature point is equal to or lower than a predetermined value may be previously acquired. This specific depth (in other words, an optical characteristic for the specific depth) may be used to perform the noise reduction for a partial region having a depth for which the degree of depth reliability is low. This specific depth is a depth closer to the in-focus plane than an original depth of the partial region, which results in the noise reduction with a lower strength.

As the optical characteristic information in this embodiment, instead of using information based on the optical transfer function, the defocus characteristic may be obtained in a simplified manner from, for example, Expression (7) or the like by using the focal length and the F-number of the imaging optical system. To perform the process with a higher accuracy, the optical characteristic information based on the optical transfer function may be used.

EXAMPLE 3

Figure 13:
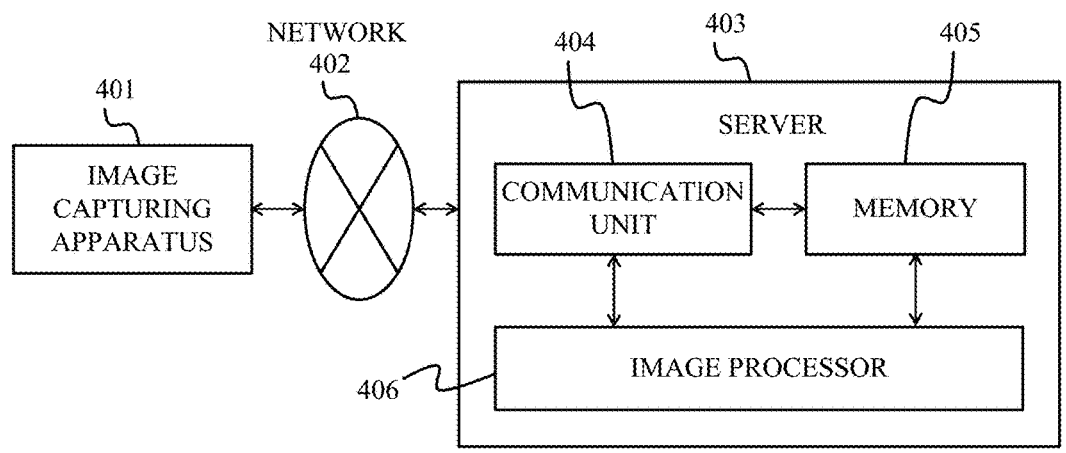
FIG. 13 is a block diagram of a configuration of an image capturing system that is Embodiment 3.
Figure 14:
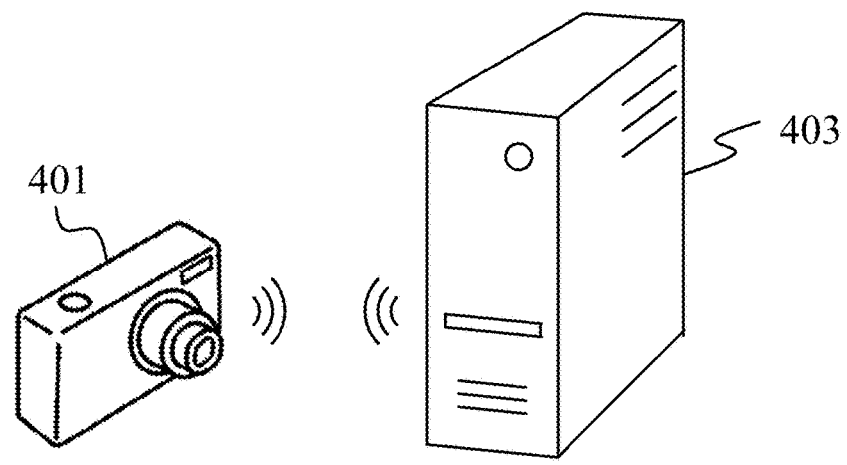
FIG. 14 is an exterior diagram of the image capturing system of Embodiment 3.

Next, description will be made of an image capturing system that is a third embodiment (Embodiment 3) of the present invention. In Embodiment 3, as illustrated in a system configuration diagram in FIG. 13 and a system exterior diagram in FIG. 14, an image capturing apparatus 401 sends an image (input image) produced by image capturing and a depth map to a server (computer) 403 as an image processing apparatus through wireless communication. The server 403 performs a noise reduction on the received input image using the received depth map. In this embodiment, similarly to Embodiment 2, an optical characteristic of the image capturing apparatus (image capturing system) 401 is the defocus.

The image capturing apparatus 401 includes an image sensor according to the TOF (time of flight) method and produces the input image by image capturing and the depth map thereof. The server 403 includes a communication unit 404 and is connected to be capable of communicating with the image capturing apparatus 401 through a network 402. When the image capturing apparatus 401 performs image capturing, the input image produced by the image capturing and the depth map is sent to the server 403 automatically or in response to an instruction provided by a user of the image capturing apparatus 401. The input image and the depth map are stored on a memory 405 in the server 403. At the same time, the optical characteristic information and the sampling information of the image capturing apparatus 401 are sent from the image capturing apparatus 401 to the server 403 and stored on the memory 405.

An image processor 406 in the server 403 performs the noise reduction described in Embodiment 2 (FIG. 8) on the input image. The server 403 sends an output image obtained as a result of the noise reduction to the image capturing apparatus 401 and stores the output image on the memory 405.

In the same image capturing system, the optical characteristic of the image capturing apparatus (image capturing system) may include the aberration and the diffraction.

This embodiment provides the server 403 and further the image capturing system which are capable of performing a highly accurate noise reduction with the optical characteristic of the image capturing apparatus 401 and the conditions of the sampling taken into consideration.

OTHER EXAMPLES

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processor (CPU), micro processor (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-257239, filed on Dec. 19, 2014 which is hereby incorporated by reference herein in its entirety.

REFERENCE SIGNS LIST 101 imaging optical system
102 image sensor
104 image processor
202 image processing apparatus
403 server

The invention claimed is:

1. An image processing apparatus comprising:
a processor configured to perform a noise reduction on at least part of an input image produced by image capturing using an image capturing system; and
an acquirer configured to acquire first information on an optical characteristic of the image capturing system and second information on sampling performed by the image capturing system, the optical characteristic indicating a factor that degrades information of an object space in the image capturing of the input image,
wherein the processor is configured to change a process of the noise reduction depending on the first information and the second information, and
wherein the first information changes with a position in the input image, and
the processor is configured to perform, on a partial region in the input image, the process of the noise reduction depending on the first information corresponding to a position of the partial region.

2. The image processing apparatus according to claim 1, wherein the first information changes with a depth in the input image,
the acquirer is configured to acquire information on a distribution of the depth in the input image, and
the processor is configured to perform, on a partial region in the input image, the process of the noise reduction depending on the first information corresponding to the depth at a position of the partial region.

3. The image processing apparatus according to claim 2, wherein the first information changes with a defocus amount of the image capturing system.

4. The image processing apparatus according to claim 2, wherein the processor is configured to provide multiple defocus characteristic regions in which defocus characteristics are mutually different, by dividing information on the distribution of the depth such that a division pitch is larger as a division position is further away from the image capturing system in a direction corresponding to the depth, and
the processor is configured to acquire the partial region from a single defocus characteristic region.

5. The image processing apparatus according to claim 2, wherein
the depth at the position of the partial region is an average value of the depth in the partial region.

6. The image processing apparatus according to claim 2, wherein the processor is configured to change the process of the noise reduction depending on reliability of the information on the distribution of the depth.

7. The image processing apparatus according to claim 6, wherein the processor is configured to change the process of the noise reduction to a process with a lower noise reduction strength as the reliability is lower.

8. The image processing apparatus according to claim 1, wherein the first information is based on an optical transfer function of the image capturing system.

9. The image processing apparatus according to claim 1, wherein the processor is configured to change the process of the noise reduction by changing a parameter for changing strength of the noise reduction or by changing a method of the noise reduction.

10. An image capturing apparatus comprising:
the image processing apparatus according to claim 1; and
at least part of the image capturing system.

11. An image processing method of performing a noise reduction on at least part of an input image produced by image capturing using an image capturing system, the method comprising:
preparing first information on an optical characteristic of the image capturing system and second information on sampling performed by the image capturing system, the optical characteristic indicating a factor that degrades information of an object space in the image capturing of the input image and the first information changing with a position in the input image;
changing a process of the noise reduction depending on the first information and the second information; and
performing, on a partial region in the input image, the process of the noise reduction depending on the first information corresponding to a position of the partial region.

12. A non-transitory computer-readable storage medium storing a computer program that causes a computer to perform noise reduction on at least part of an input image produced by image capturing using an image capturing system by causing the computer to:
acquire first information on an optical characteristic of the image capturing system and second information on sampling performed by the image capturing system, the optical characteristic indicating a factor that degrades information of an object space in the image capturing of the input image and the first information changing with a position in the input image;
change a process of the noise reduction depending on the first information; and
perform, on a partial region in the input image, the process of the noise reduction depending on the first information corresponding to a position of the partial region.

13. An image processing apparatus comprising:
a processor configured to perform a noise reduction on at least part of an input image produced by image capturing using an image capturing system; and an acquirer configured to acquire first information on an optical characteristic of the image capturing system, the optical characteristic indicating a factor that degrades information of an object space in the image capturing of the input image, wherein the processor is configured to change a process of the noise reduction depending on the first information, wherein the first information changes with a depth in the input image, the acquirer is configured to acquire information on a distribution of the depth in the input image, and the processor is configured to perform, on a partial region in the input image, the process of the noise reduction depending on the first information corresponding to the depth at a position of the partial region, and wherein the processor is configured to provide multiple defocus characteristic regions in which defocus characteristics are mutually different, by dividing information on the distribution of the depth such that a division pitch is larger as a division position is further away from the image capturing system in a direction corresponding to the depth, and the processor is configured to acquire the partial region from a single defocus characteristic region.

14. An image processing apparatus comprising:

a processor configured to perform a noise reduction on at least part of an input image produced by image capturing using an image capturing system; and an acquirer configured to acquire first information on an optical characteristic of the image capturing system, the optical characteristic indicating a factor that degrades information of an object space in the image capturing of the input image, wherein the processor is configured to change a process of the noise reduction depending on the first information, wherein the first information changes with a depth in the input image, the acquirer is configured to acquire information on a distribution of the depth in the input image, and the processor is configured to perform, on a partial region in the input image, the process of the noise reduction depending on the first information corresponding to the depth at a position of the partial region, and wherein the processor is configured to change the process of the noise reduction depending on reliability of the information on the distribution of the depth.

* * * * *